5748X
W. H. BELL.
Gun Carriage.
Patented Dec. 8, 1829.
No Printed Specification Available
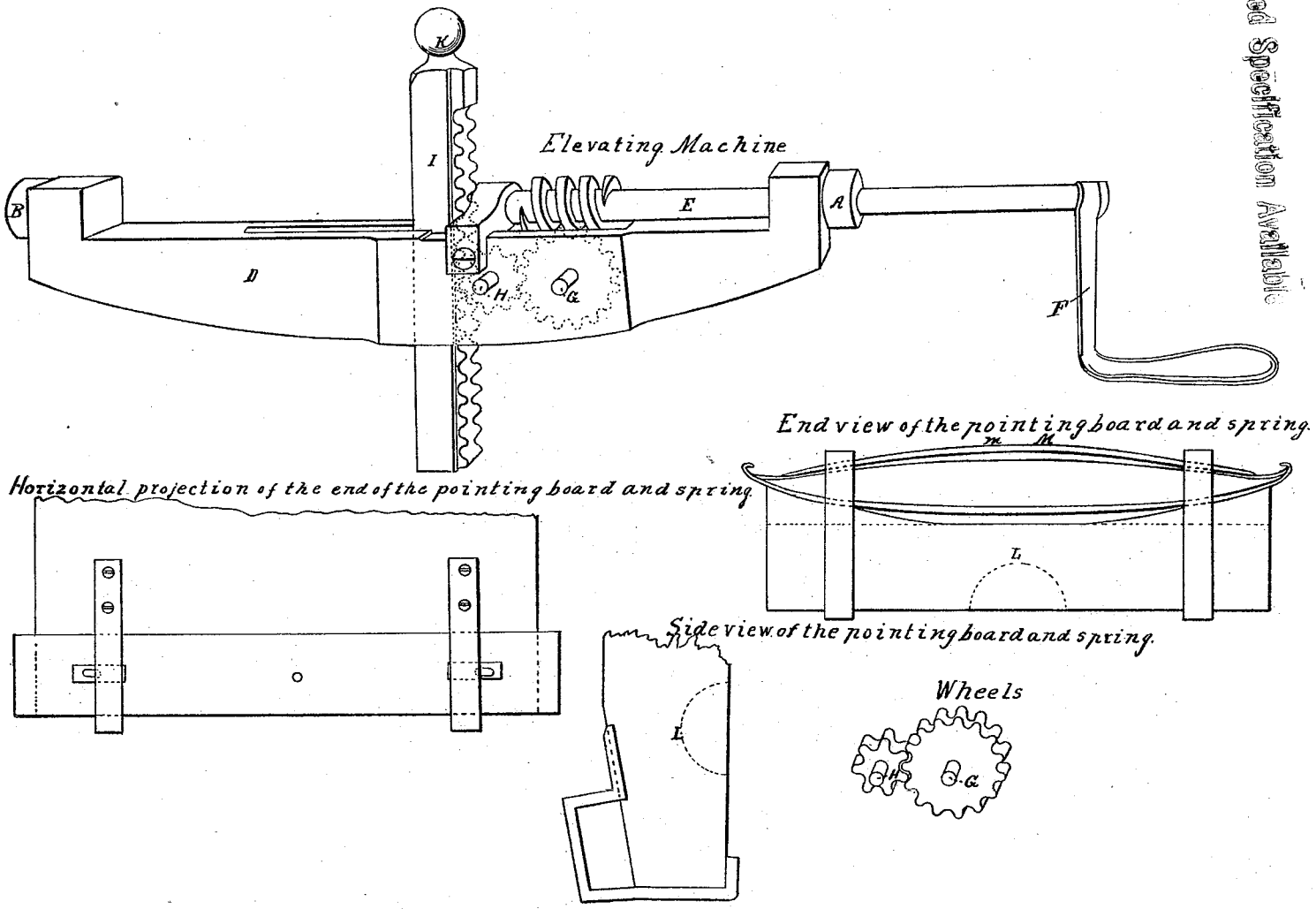
N. PETERS, PHOTO-LITHOGRAPHER, WASHINGTON, D. C.